US012736213B1

(12) United States Patent
Mongeon et al.

(10) Patent No.: US 12,736,213 B1
(45) Date of Patent: Sep. 15, 2026

(54) LIGHTED TOOL-ORGANIZING APRON FOR LINEMAN USE IN A BUCKET

(71) Applicants: Katie M. Mongeon, Lancaster, SC (US); Matthew D. Mongeon, Lancaster, SC (US)

(72) Inventors: Katie M. Mongeon, Lancaster, SC (US); Matthew D. Mongeon, Lancaster, SC (US)

( * ) Notice: Subject to any disclaimer, the term of this patent is extended or adjusted under 35 U.S.C. 154(b) by 0 days.

(21) Appl. No.: 19/370,864

(22) Filed: Oct. 28, 2025

(51) Int. Cl.
*F21V 33/00* (2006.01)
*B25H 3/00* (2006.01)
*B66F 13/00* (2006.01)

(52) U.S. Cl.
CPC ........... *F21V 33/0084* (2013.01); *B25H 3/00* (2013.01); *B66F 13/00* (2013.01)

(58) Field of Classification Search
CPC ......... F21V 33/0084; B25H 3/00; B25H 1/12; B25H 5/00; B66F 13/00; B66F 17/006; B60R 11/06
See application file for complete search history.

(56) References Cited

U.S. PATENT DOCUMENTS 5,385,281 A * 1/1995 Byrd .......................... A45F 5/02 224/663
5,511,705 A * 4/1996 Dreszer .................... A45F 5/021 224/678
5,547,115 A * 8/1996 Ambrosius .............. B25H 3/00 224/904
5,653,337 A 8/1997 Cirgliano
6,076,937 A * 6/2000 Wood ........................ F21S 9/02 362/156
6,379,023 B1 * 4/2002 Passno ...................... F21S 9/04 362/486
D477,142 S 7/2003 Dancyger
8,701,952 B1 4/2014 Tripp
9,249,003 B2 2/2016 Reeves
D779,196 S 2/2017 Kinskey
11,054,120 B1 * 7/2021 Gable ..................... F21V 21/30
2003/0131398 A1 * 7/2003 Haines .................... A45F 5/021 2/312
2007/0103892 A1 5/2007 McDaniel
2012/0298539 A1 11/2012 Purnell
(Continued)

FOREIGN PATENT DOCUMENTS

WO 2016030776 3/2016

*Primary Examiner* — James R Greece
*Assistant Examiner* — Michael Chiang
(74) *Attorney, Agent, or Firm* — Kyle A. Fletcher, Esq.

(57) ABSTRACT

The lighted tool-organizing apron for linemen may include an apron and an illumination system. The lighted tool-organizing apron for linemen may be a hanging tool organizer for use by linemen. The apron may be hung on the side of a bucket of a bucket truck. The apron may include a plurality of tool pockets, one or more pouches, a hammer holster, a knife sheath, and a rotating snap hook for retaining plurality of tools. The illumination system may illuminate the apron for use at night. The illumination system may be organized into a plurality of illumination tiers in order to illuminate the plurality of tools effectively. The apron may optionally include a magnet for retaining metal hardware and small tools. The apron may include a wear guard that may be personalized.

19 Claims, 5 Drawing Sheets

(56) References Cited

U.S. PATENT DOCUMENTS

| | | | | |
|---|---|---|---|---|
| 2014/0374293 | A1 * | 12/2014 | Hassler | B25H 3/00 206/349 |
| 2018/0070691 | A1 * | 3/2018 | Franks | A45C 13/02 |
| 2020/0029677 | A1 * | 1/2020 | Griffin | A45F 5/021 |
| 2020/0298391 | A1 * | 9/2020 | Frazier | B25H 3/00 |
| 2022/0106798 | A1 * | 4/2022 | Johnson | E04G 5/003 |
| 2023/0270266 | A1 * | 8/2023 | Paprocki | A47F 5/0025 211/94.01 |
| 2025/0341306 | A1 * | 11/2025 | Berg | B60R 11/06 |

* cited by examiner

LIGHTED TOOL-ORGANIZING APRON FOR LINEMAN USE IN A BUCKET

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to utility lineman gear, specifically to tool organizers and aprons designed for use in bucket trucks, incorporating integrated illumination systems for low-light operation.

Utility linemen frequently work in elevated buckets where lighting is poor or inconsistent. Traditional tool aprons offer no illumination, and external headlamps or bucket lights create glare and occupy workspace. The need exists for a bucket-mounted apron that provides built-in, evenly distributed lighting.

The Lighted Tool-Organizing Apron for Linemen integrates a tiered LED lighting system directly into a bucket-hanging apron, offering even illumination of tools and pockets. The system operates via a battery or USB power source and includes user controls for brightness.

SUMMARY OF INVENTION

The lighted tool-organizing apron for linemen may comprise an apron and an illumination system. The lighted tool-organizing apron for linemen may be a hanging tool organizer adapted for use by linemen. The apron may be configured to hang on the side of a bucket of a bucket truck. The apron may comprise a plurality of tool pockets, one or more pouches, a hammer holster, a knife sheath, and a rotating snap hook for retaining plurality of tools. The illumination system may illuminate the apron for use at night. The illumination system may be organized into a plurality of illumination tiers in order to illuminate the plurality of tools effectively. The apron may optionally comprise a magnet for retaining metal hardware and small tools. The apron may comprise a wear guard that may be personalized.

An object of the invention is to provide a tool-organizing apron that may be hung on the side of a bucket of a bucket truck.

Another object of the invention is to provide an illumination system to illuminate the front of the apron.

A further object of the invention is to provide a plurality of tool pockets, one or more pouches, a hammer holster, and a knife sheath.

Yet another object of the invention is to provide a wear guard that may be personalized.

Another object of the invention is to provide a tiered LED lighting system for even illumination.

Another object of the invention is to provide a flexible embedded wiring connecting LEDs, battery, and switch.

Another objection of the invention is to provide eyelets for secure hanging on bucket hooks.

Another object of the invention is to provide multiple pockets, pouches, holster, and magnetized tool area.

Another object of the invention is to provide a leather wear guard with optional personalization.

Another object of the invention is to provide an operator control for on/off and brightness adjustment.

These together with additional objects, features and advantages of the lighted tool-organizing apron for linemen will be readily apparent to those of ordinary skill in the art upon reading the following detailed description of the presently preferred, but nonetheless illustrative, embodiments when taken in conjunction with the accompanying drawings.

In this respect, before explaining the current embodiments of the lighted tool-organizing apron for linemen in detail, it is to be understood that the lighted tool-organizing apron for linemen is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the lighted tool-organizing apron for linemen.

It is therefore important that the claims be regarded as including such equivalent construction insofar as they do not depart from the spirit and scope of the lighted tool-organizing apron for linemen. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
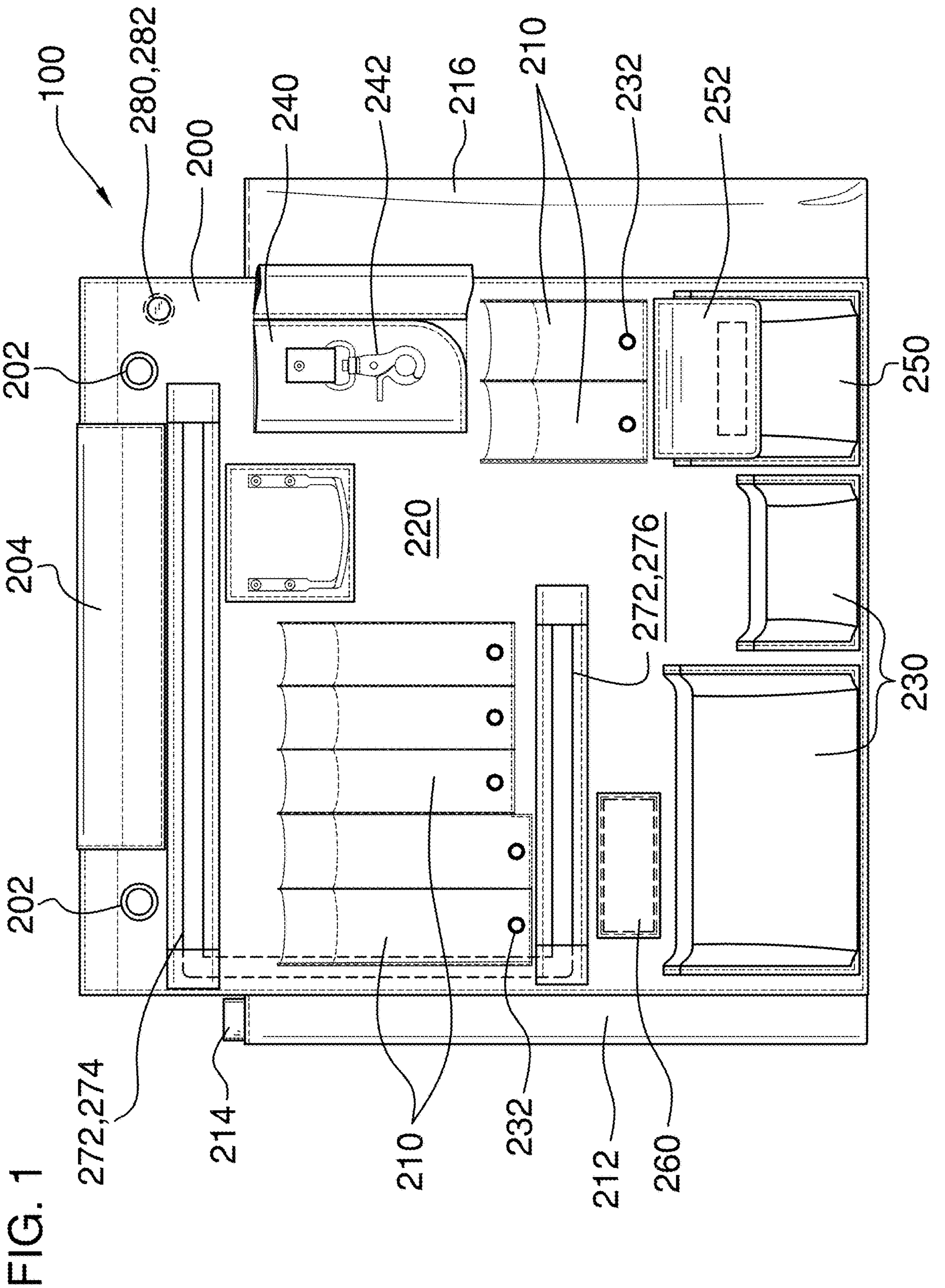
FIG. 1 is a front view of an embodiment of the disclosure.
Figure 2:
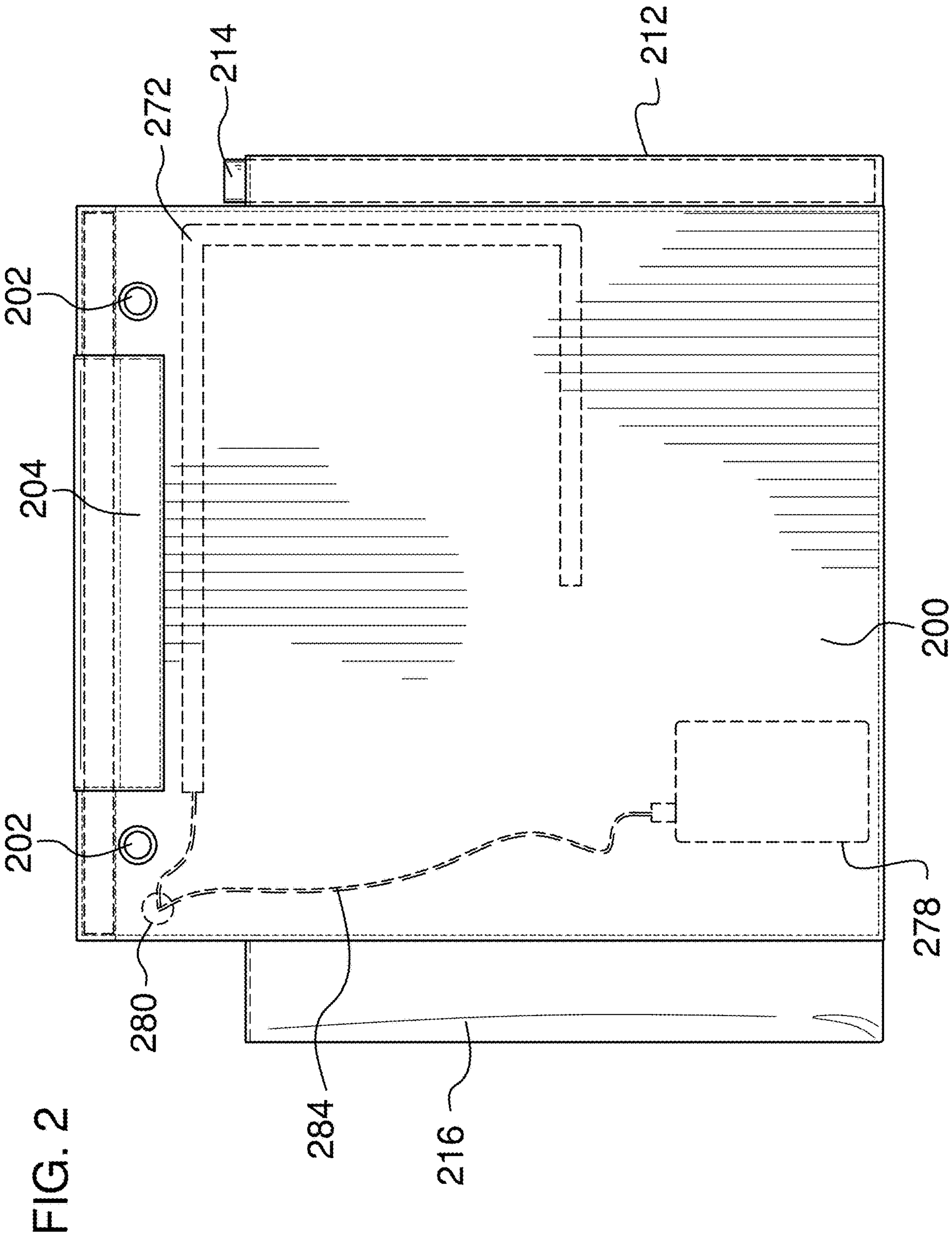
FIG. 2 is a rear view of an embodiment of the disclosure.
Figure 3:
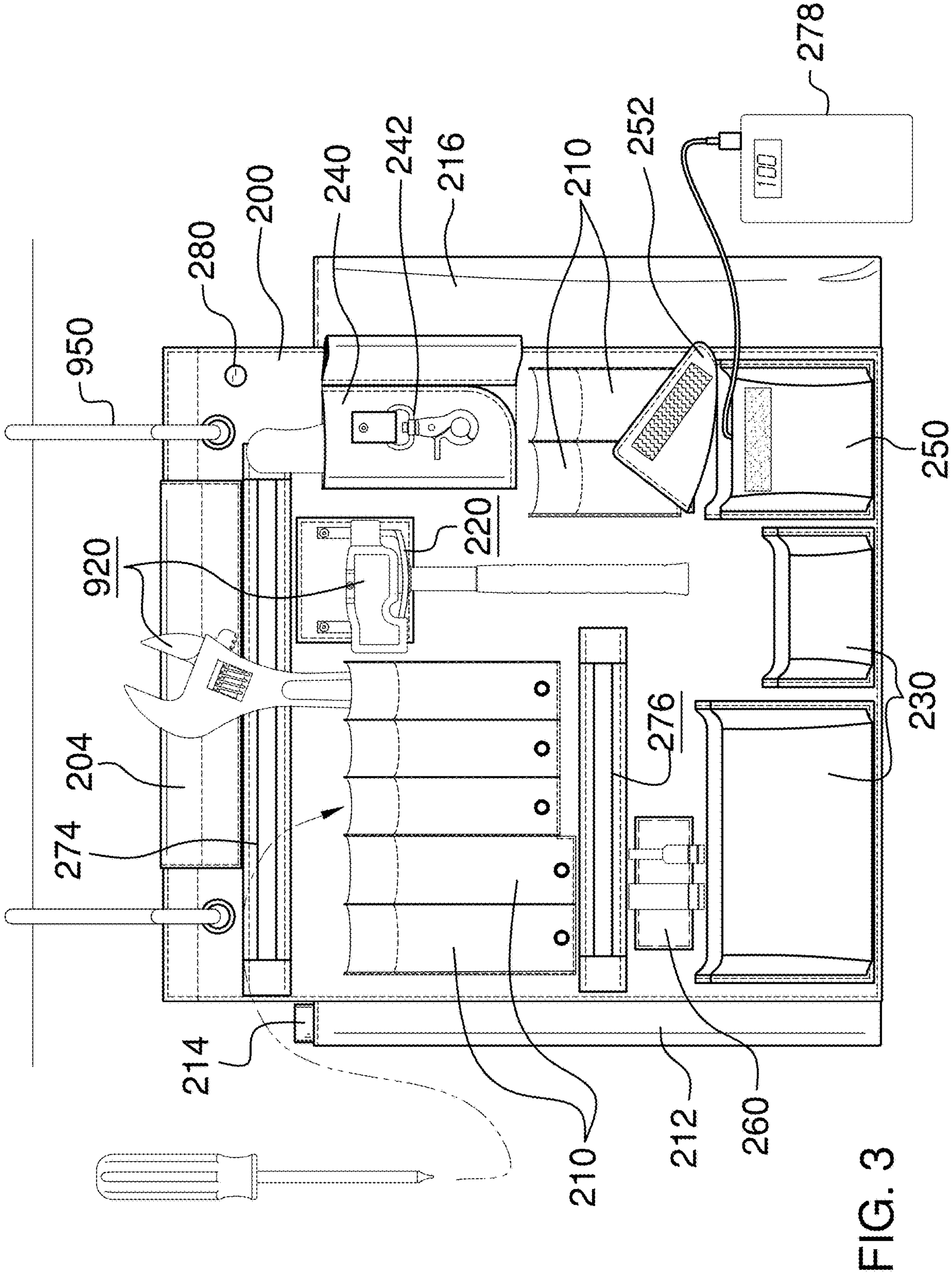
FIG. 3 is a detail view of an embodiment of the disclosure.
Figure 4:
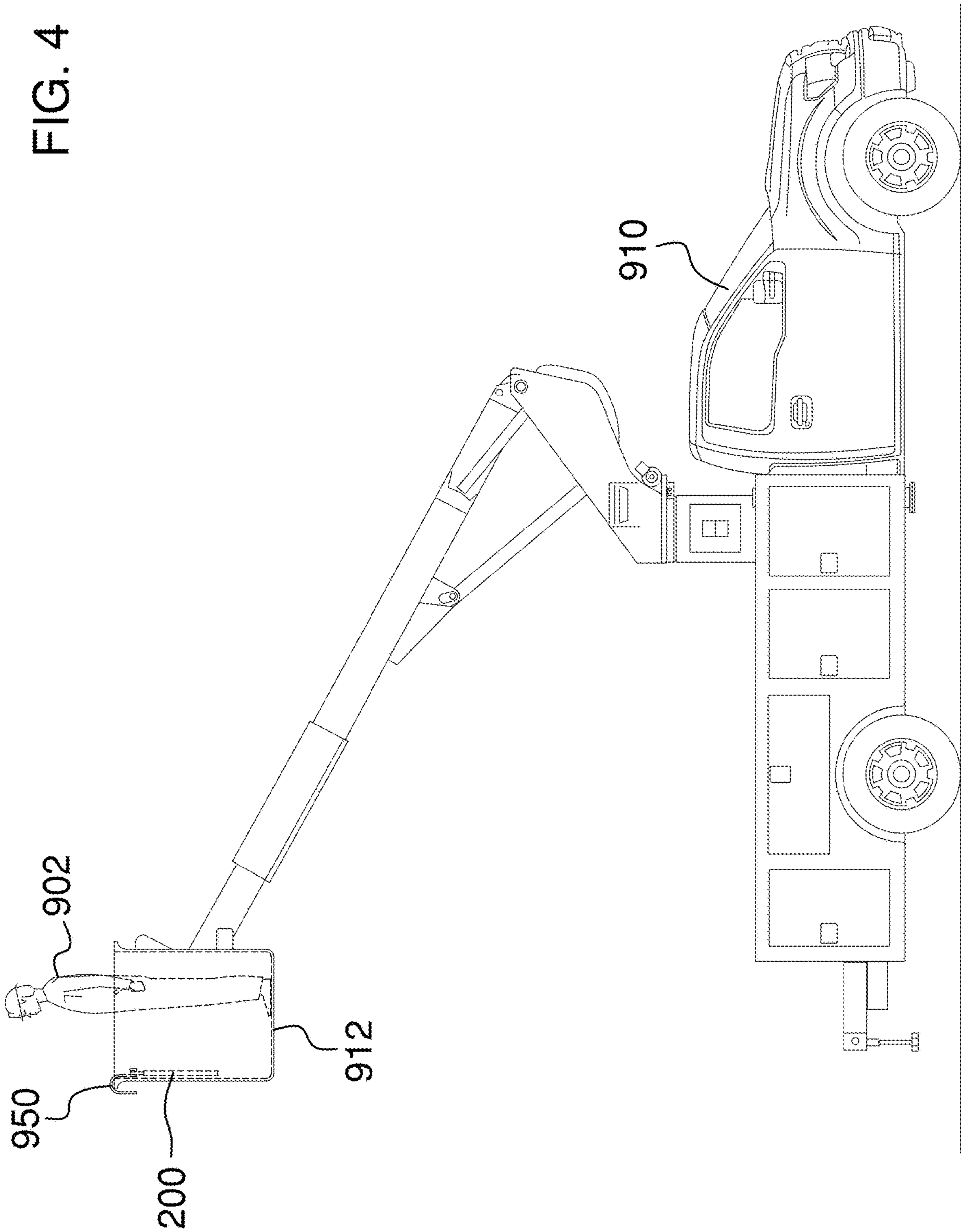
FIG. 4 is an in-use view of an embodiment of the disclosure.
Figure 5:
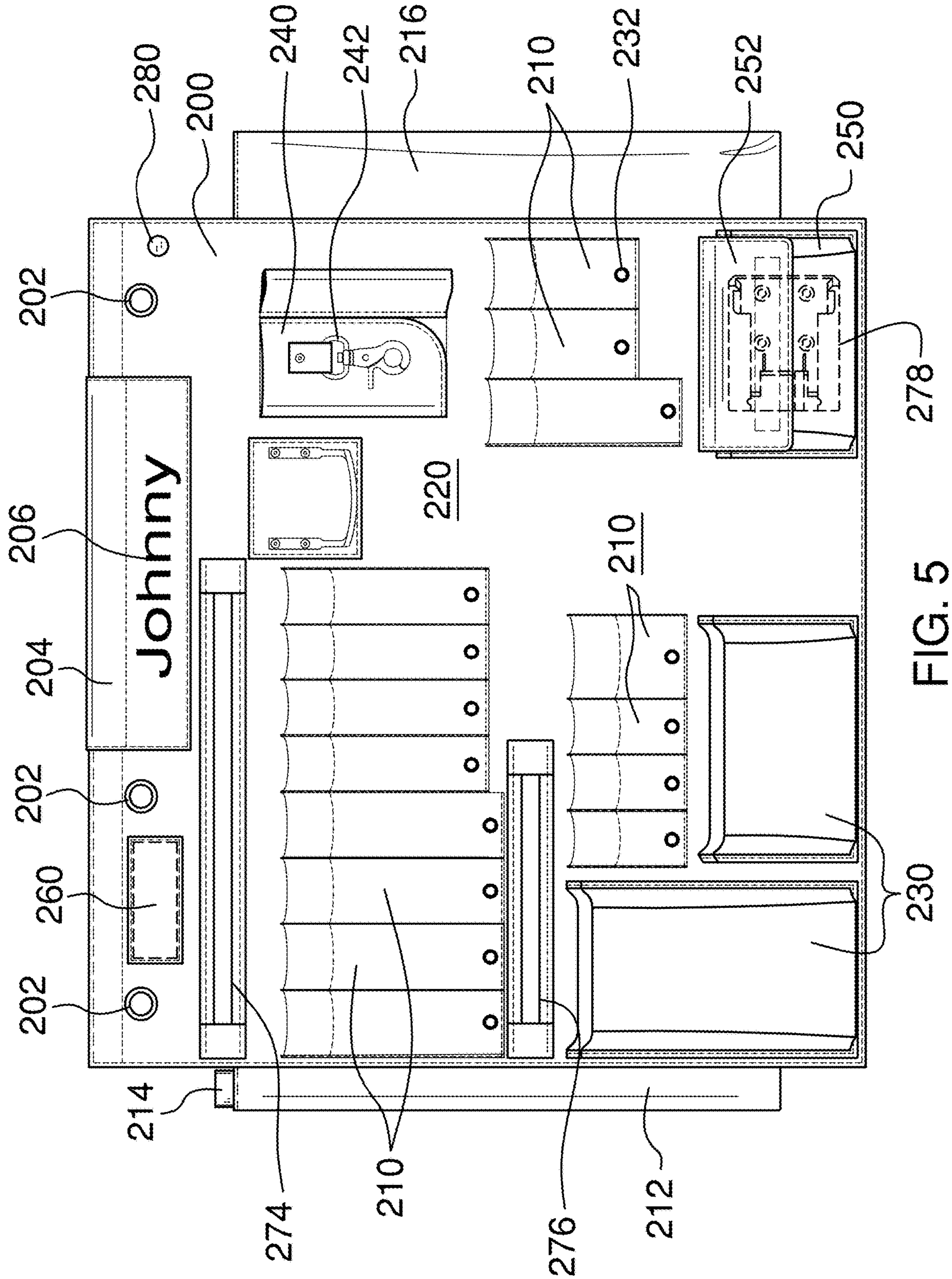
FIG. 5 is a front view of an alternative embodiment of the disclosure, illustrating a different arrangement of the pocket, pouches, magnet, and hanger eyelets.

Detailed reference will now be made to a first potential embodiment of the disclosure, which is illustrated in FIGS. 1 through 5.

The lighted tool-organizing apron for linemen 100 (hereinafter invention) comprises an apron 200 and an illumination system. The invention 100 may be a hanging tool organizer adapted for use by linemen. The apron 200 may be configured to hang on the side of a bucket 912 of a bucket truck 910. The apron 200 may comprise a plurality of tool pockets 210, one or more pouches 230, a hammer holster 220, a knife sheath 240, and a rotating snap hook 242 for retaining plurality of tools 920. The illumination system may illuminate the apron 200 for use at night. The illumination system may be organized into a plurality of illumination tiers in order to illuminate the plurality of tools 920 effectively. The apron 200 may optionally comprise a magnet 260 for retaining metal hardware and small tools. The apron 200 may comprise a wear guard 204 that may be personalized.

The apron 200 may organize the plurality of tools 920 by providing storage locations for the plurality of tools 920. The apron 200 may be adapted to hang on the side of the bucket 912 of the bucket truck 910 to make the plurality of tools 920 accessible to a lineman 902. The apron 200 may comprise the plurality of tool pockets 210. The plurality of tool pockets 210 may be open top compartments that individual tools may be placed into.

The plurality of tool pockets 210 may be organized as one or more groups of pockets where individual tool pockets within an individual group of pockets are adjacent to each other.

The apron 200 may comprise a first side pocket 212 and a second side pocket 216. The first side pocket 212 and the second side pocket 216 may be located on the left side and right side of the apron 200, respectively. The first side pocket 212 and the second side pocket 216 may be deeper than the plurality of tool pockets 210. The depth of the first side pocket 212 and the second side pocket 216 may be greater than one half of the height of the apron 200. The first side pocket 212 may comprise a liner 214 to protect the first side pocket 212. As a non-limiting example, the liner 214 may be a PVC pipe. As non-limiting examples, the first side pocket 212 may be configured to carry an auger bit and the second side pocket 216 may be configured to carry a hot cutter.

The hammer holster 220 may be a metal armature configured to carry a hammer by inserting the handle of the hammer through the hammer holster 220 such that the head of the hammer rests on the top of the hammer holster 220.

The one or more pouches 230 may be open top compartments that parts or tools may be placed into. The one or more pouches 230 may have a larger footprint compared to the plurality of tool pockets 210. The one or more pouches 230 may be wider than the plurality of tool pockets 210 and may project farther away from the apron 200.

The knife sheath 240 may be a leather-lined pocket for a knife. The blade of the knife may be placed into the knife sheath 240 to shield the blade.

In some embodiments, the rotating snap hook 242 may be coupled to the apron 200 via the knife sheath 240. The rotating snap hook 242 may be configured to carry an item that is coupled to the rotating snap hook 242

In some embodiments, the apron 200 may comprise the magnet 260 that is sewn into the apron 200 such that the magnet 260 is captive to the apron 200 in a stationary location. The magnet 260 may retain the metal hardware and small tools placed against the magnet 260.

The apron 200 may comprise a plurality of hanger eyelets 202. The plurality of hanger eyelets 202 may be located adjacent to the top of the apron 200 and distributed across the top of the apron 200 so as to support the weight of the apron 200. The plurality of hanger eyelets 202 may accept a plurality of hanger hooks 950 that are used to hang the apron 200 on the side of the bucket 912. The plurality of tool pockets 210, the first side pocket 212, the second side pocket 216, the one or more pouches 230, a battery pocket 250, or any combination thereof may comprise one or more drainage eyelets 232. The one or more drainage eyelets 232 may be located adjacent to the bottom of the plurality of tool pockets 210, the first side pocket 212, the second side pocket 216, the one or more pouches 230, and the battery pocket 250. The one or more drainage eyelets 232 may be configured to allow water to drain from within the compartments.

The wear guard 204 may be a leather shield that wraps over the top of the apron 200 to prevent wear. The wear guard 204 may be coupled to the apron 200. In some embodiments, the wear guard 204 may comprise personalization 206. The personalization 206 may be indicia that is applied to the wear guard 204. As non-limiting examples, the personalization 206 may be printed, embroidered, silk-screened, embossed or otherwise marked on the wear guard 204. As a non-limiting example, the personalization 206 may be a name.

The illumination system may comprise an LED light strip 272, a battery 278, an operator control 280, and wiring 284. The LED light strip 272 may be flexible such that the LED light strip 272 may be folded to form the plurality of illumination tiers. The plurality of illumination tiers may be horizontally oriented. The plurality of illumination tiers may comprise at least an upper illumination tier 274 and a lower illumination tier 276. The upper illumination tier 274 may be positioned at the top of the apron 200 and above a first subset of the plurality of tool pockets 210 and/or the one or more pouches 230. The lower illumination tier 276 may be positioned lower than the upper illumination tier 274, above a second subset of the plurality of tool pockets 210 and/or the one or more pouches 230.

The LED light strip 272 may be exposed at a horizontal orientation on the front of the apron 200 to form the upper illumination tier 274. The LED light strip 272 may bend by 90 degrees and descend vertically to the height of the lower illumination tier 276. The vertical section of the LED light strip 272 may be hidden from view by the apron 200. The LED light strip 272 may bend by 90 degrees and may be exposed at a horizontal orientation on the front of the apron 200 to form the lower illumination tier 276.

The battery 278 may comprise one or more energy-storage devices. The battery 278 may be a source of electrical energy to operate the LED light strip 272. The battery 278 may be rechargeable and/or replaceable. The battery 278 may be carried in the battery pocket 250. The battery pocket 250 may comprise a cover flap 252 to protect and retain the battery 278.

The operator control 280 may provide an ON/OFF function to energize and de-energize the LED light strip 272 and a brightness function to control the brightness of the LED light strip 272. A rotary switch 282 may provide one or more ON positions, one or more OFF positions, and a plurality of brightness positions that alter the voltage and/or current applied to the LED light strip 272 in order to change the brightness of the LED light strip 272. The wiring 284 may electrically couple the battery 278, the rotary switch 282 and the LED light strip 272 such that the rotary switch 282 may control operation of the LED light strip 272.

The rotary switch 282 may be replaced with a toggle switch, a dial, knob, button, etc. Also, it shall be noted that the rotary switch 282 may be called a control member. The primary function of the rotary switch 282 is to control the output of the LED light strip 272.

In use, the apron 200 may be stocked with a plurality of tools 920 by placing the plurality of tools 920 into the plurality of tool pockets 210, the one or more pouches 230, the hammer holster 220, and the knife sheath 240. As non-limiting examples, one or more screw drivers, one or more adjustable wrenches, and one or more fixed wrenches may be placed into the plurality of tool pockets 210, the hammer may be placed into the hammer holster 220, and the knife may be placed into the knife sheath 240. The auger bit may be placed into the first side pocket 212 and the hot cutter may be placed into the second side pocket 216. The apron 200 may be hung on the side of the bucket 912 of a bucket truck 910 using a plurality of hanger hooks 950. The plurality of tools 920 may be accessed and replaced during a job. In low light situations, the illumination system may be activated to illuminate the plurality of tool pockets 210 and the one or more pouches 230.

Definitions

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" may refer to top and "lower" may refer to the bottom. As a non-limiting example, the upper end of a vertical shaft is the top end of the vertical shaft.

Throughout this document the terms "battery", "battery pack", and "batteries" may be used interchangeably to refer to one or more wet or dry cells or batteries of cells in which chemical energy is converted into electricity and used as a source of DC power. References to recharging or replacing batteries may refer to recharging or replacing individual cells, individual batteries of cells, or a package of multiple battery cells as is appropriate for any given battery technology that may be used. The battery may require electrical contacts which may not be illustrated in the figures.

As used herein, the words "control" or "controls" are intended to include any device which can cause the completion or interruption of an electrical circuit; non-limiting examples of controls include toggle switches, rocker switches, push button switches, rotary switches, electromechanical relays, solid state relays, touch sensitive interfaces and combinations thereof whether they are normally open, normally closed, momentary contact, latching contact, single pole, multi-pole, single throw, or multi-throw. In some embodiments, a control may alter an electrical property of a circuit such as resistance, inductance, or capacitance.

As used herein, the words "couple", "couples", "coupled" or "coupling", may refer to connecting, either directly or indirectly, and does not necessarily imply a mechanical connection.

As used herein, "energize" and/or "energization" may refer to the application of an electrical potential to a system or subsystem. "De-energize" and/or "de-energization" may refer to the removal of the electrical potential.

As used herein, "front" may indicate the side of an object that is closest to a forward direction of travel under normal use of the object or the side or part of an object that normally presents itself to view or that is normally used first. "Rear" or "back" may refer to the side that is opposite the front.

As used in this disclosure, a "hook" may be an object that is curved or bent at an angle such that items can be hung on or caught by the object or such that the object may be suspended from another object.

As used in this disclosure, "horizontal" may be a directional term that refers to a direction that is perpendicular to the local force of gravity. Unless specifically noted in this disclosure, the horizontal direction is always perpendicular to the vertical direction.

As used herein, "hot cutter" (also known as "hot knife" or "thermocutter") may refer to tool that uses a heated blade or wire to cut synthetic material such as rope, webbing, foam, and fabric. The heat cuts the material and seals the edge of the material to prevent fraying and unraveling.

As used in this disclosure, the term "indicia" may refer to one or more markings that identify a sentiment.

As used in this disclosure, a "magnet" may be an ore, alloy, or other material that has its component atoms arranged so that the material exhibits properties of magnetism such as attracting iron-containing objects or aligning itself in an external magnetic field.

As used in this disclosure, "orientation" may refer to the positioning and/or angular alignment of a first object relative to a second object or relative to a reference position or reference direction.

As used herein, the words "printed", "marked", and "marking" may refer to a mark that has been made on an object. The process of making the mark may involve printing, lithography, thermal transfer, painting, embossing, debossing, molding, burning, punching, silk-screening, drawing, etching, engraving, stenciling, stamping, spraying of pigments, applying adhesive tape, or other processes which result in the controlled change of coloration and/or shape of a surface.

As used in this disclosure, a "sheath" may be a shell that is used to cover all or a portion of an object. In some cases, the object may be movable within the sheath. In some cases, the object may be inserted and withdrawn.

As used herein, "subset" may refer to a relationship between two sets. Set 'A' may be said to be a subset of set 'B' if all elements of set 'A' are also elements of set 'B'. The definition of subset allows that the membership of set 'A' may equal the membership of set 'B'. A subset may also be an empty set, meaning that the subset may have no members.

As used in this disclosure, a "switch" may be an electrical device that starts and stops the flow of electricity through an electric circuit by completing or interrupting an electric circuit. The act of completing or interrupting the electrical circuit may be called actuation. Completing or interrupting an electric circuit with a switch is often referred to as closing or opening a switch, respectively. Completing or interrupting an electric circuit is also referred to as making or breaking the circuit, respectively.

As used herein, "tier" may refer to a row, rank, layer, or level of a structure, typically one of a plurality of rows placed one above the other.

As used in this disclosure, "vertical" may refer to a direction that is parallel to the local force of gravity. Unless specifically noted in this disclosure, the vertical direction is always perpendicular to horizontal.

Throughout this document references to "wire", "wires", "wired", or "wiring" may describe and/or show a single conductor when, in fact, two conductors may be required to power or control a subsystem; a convention used herein is that the common return conductor to which all electrical subsystems are connected may not be shown in order to clarify the figures. This common return conductor is a continuous electrical path and does not pass through any type of switch or other electrical component other than the possibility of passing through one or more connectors.

With respect to the above description, it is to be realized that the optimum dimensional relationship for the various components of the invention described above and in FIGS. 1 through 5, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A lighted tool-organizing apron for linemen comprising:

an apron and an illumination system;

wherein the lighted tool-organizing apron for linemen use in a bucket is a hanging tool organizer adapted for use by linemen;

wherein the apron is configured to hang on the side of a bucket of a bucket truck;

wherein the apron comprises a plurality of tool pockets, one or more pouches, a hammer holster, a knife sheath, and a rotating snap hook for retaining plurality of tools;

wherein the illumination system illuminates the apron for use at night;

wherein the illumination system is organized into a plurality of illumination tiers;

wherein the illumination system comprises an LED light strip, a battery, an operator control, and wiring;

wherein the LED light strip is flexible such that the LED light strip is folded to form the plurality of illumination tiers;

wherein the plurality of illumination tiers are horizontally oriented;

wherein the plurality of illumination tiers comprise at least an upper illumination tier and a lower illumination tier;

wherein the upper illumination tier is positioned at a top of the apron and above a first subset of the plurality of tool pockets and/or the one or more pouches;

wherein the lower illumination tier is positioned lower than the upper illumination tier, above a second subset of the plurality of tool pockets and/or the one or more pouches.

2. The lighted tool-organizing apron for linemen use in a bucket according to claim 1 wherein the apron organizes the plurality of tools by providing storage locations for the plurality of tools;

wherein the apron is adapted to hang on the side of the bucket of the bucket truck to make the plurality of tools accessible to a lineman;

wherein the apron comprises the plurality of tool pockets;

wherein the plurality of tool pockets are open top compartments that individual tools are placed into.

3. The lighted tool-organizing apron for linemen use in a bucket according to claim 2 wherein the plurality of tool pockets are organized as one or more groups of pockets where individual tool pockets within an individual group of pockets are adjacent to each other.

4. The lighted tool-organizing apron for linemen use in a bucket according to claim 3 wherein the apron comprises a first side pocket and a second side pocket;

wherein the first side pocket and the second side pocket are located on the left side and right side of the apron, respectively;

wherein the first side pocket and the second side pocket are deeper than the plurality of tool pockets;

wherein the depth of the first side pocket and the second side pocket are greater than one half of the height of the apron.

5. The lighted tool-organizing apron for linemen use in a bucket according to claim 4 wherein the first side pocket comprises a liner to protect the first side pocket.

6. The lighted tool-organizing apron for linemen use in a bucket according to claim 5 wherein the liner is a PVC pipe.

7. The lighted tool-organizing apron for linemen use in a bucket according to claim 5 wherein the hammer holster is a metal armature configured to carry a hammer by inserting the handle of the hammer through the hammer holster such that the head of the hammer rests on the top of the hammer holster.

8. The lighted tool-organizing apron for linemen use in a bucket according to claim 7 wherein the one or more pouches are open top compartments that parts or tools are placed into;

wherein the one or more pouches have a larger footprint compared to the plurality of tool pockets;

wherein the one or more pouches are wider than the plurality of tool pockets and project farther away from the apron.

9. The lighted tool-organizing apron for linemen use in a bucket according to claim 8 wherein the knife sheath is a leather-lined pocket for a knife;

wherein the blade of the knife is placed into the knife sheath to shield the blade.

10. The lighted tool-organizing apron for linemen use in a bucket according to claim 9 wherein the rotating snap hook is coupled to the apron via the knife sheath;

wherein the rotating snap hook is configured to carry an item that is coupled to the rotating snap hook.

11. The lighted tool-organizing apron for linemen use in a bucket according to claim 10 wherein the apron comprises a magnet that is sewn into the apron such that the magnet is captive to the apron at a stationary location.

12. The lighted tool-organizing apron for linemen use in a bucket according to claim 10 wherein the apron comprises a plurality of hanger eyelets;

wherein the plurality of hanger eyelets are located adjacent to the top of the apron and distributed across the top of the apron so as to support the weight of the apron;

wherein the plurality of hanger eyelets accept a plurality of hanger hooks that are used to hang the apron on the side of the bucket;

wherein the plurality of tool pockets, the first side pocket, the second side pocket, the one or more pouches, a battery pocket, or any combination thereof comprise one or more drainage eyelets;

wherein the one or more drainage eyelets are located adjacent to the bottom of the plurality of tool pockets, the first side pocket, the second side pocket, the one or more pouches, and the battery pocket;

wherein the one or more drainage eyelets are configured to allow water to drain from within the compartments.

13. The lighted tool-organizing apron for linemen use in a bucket according to claim 12 wherein a wear guard is a leather shield that wraps over the top of the apron to prevent wear;

wherein the wear guard is coupled to the apron.

14. The lighted tool-organizing apron for linemen use in a bucket according to claim 13 wherein the wear guard comprises personalization;

wherein the personalization is indicia that is applied to the wear guard.

15. The lighted tool-organizing apron for linemen use in a bucket according to claim 14 wherein the personalization is printed, embroidered, silk-screened, embossed or otherwise marked on the wear guard.

16. The lighted tool-organizing apron for linemen use in a bucket according to claim 14 wherein the personalization is a name.

17. The lighted tool-organizing apron for linemen use in a bucket according to claim 13 wherein the LED light strip is exposed at a horizontal orientation on the front of the apron to form the upper illumination tier;

wherein the LED light strip bends by 90 degrees and descend vertically to the height of the lower illumination tier;

wherein the vertical section of the LED light strip is hidden from view by the apron;

wherein the LED light strip bends by 90 degrees and is exposed at a horizontal orientation on the front of the apron to form the lower illumination tier.

18. The lighted tool-organizing apron for linemen use in a bucket according to claim 13 wherein the battery comprises one or more energy-storage devices;

wherein the battery is a source of electrical energy to operate the LED light strip;

wherein the battery is rechargeable and/or replaceable;

wherein the battery is carried in the battery pocket;

wherein the battery pocket comprises a cover flap to protect and retain the battery.

19. The lighted tool-organizing apron for linemen use in a bucket according to claim 18 wherein the operator control provides an ON/OFF function to energize and de-energize the LED light strip and a brightness function to control the brightness of the LED light strip;

wherein a control member provides one or more ON positions, one or more OFF positions, and a plurality of brightness positions that alter the voltage and/or current applied to the LED light strip in order to change the brightness of the LED light strip;

wherein the wiring electrically couples the battery, the control member and the LED light strip such that the control member controls operation of the LED light strip.

* * * * *